United States Patent
Zhang

(10) Patent No.: US 7,345,277 B2
(45) Date of Patent: Mar. 18, 2008

(54) IMAGE INTENSIFIER AND LWIR FUSION/COMBINATION SYSTEM

(75) Inventor: Evan Y. W. Zhang, Beavercreek, OH (US)

(73) Assignee: Evan Zhang, Centerville, OH (US)

( * ) Notice: Subject to any disclaimer, the term of this patent is extended or adjusted under 35 U.S.C. 154(b) by 186 days.

(21) Appl. No.: 09/925,059

(22) Filed: Aug. 8, 2001

(65) Prior Publication Data

US 2002/0030163 A1  Mar. 14, 2002

Related U.S. Application Data

(60) Provisional application No. 60/224,189, filed on Aug. 9, 2000.

(51) Int. Cl.
*G01J 5/00* (2006.01)

(52) U.S. Cl. ..................................... 250/330
(58) Field of Classification Search ................. 250/330
See application file for complete search history.

(56) References Cited

U.S. PATENT DOCUMENTS

| | | | |
|---|---|---|---|
| 3,379,830 A * | 4/1968 | Menke ...................... 348/35 |
| 4,488,414 A * | 12/1984 | Jungkman et al. ........... 62/51.1 |
| 4,632,498 A * | 12/1986 | Neil .......................... 359/354 |
| 4,720,871 A * | 1/1988 | Chambers .................... 382/278 |
| 4,786,966 A * | 11/1988 | Hanson et al. .............. 348/158 |
| 4,949,378 A * | 8/1990 | Mammone .................. 380/276 |
| 5,001,558 A | 3/1991 | Burley et al. |
| 5,035,472 A * | 7/1991 | Hansen ...................... 359/350 |
| 5,336,899 A * | 8/1994 | Nettleton et al. ...... 250/559.29 |
| 5,389,788 A * | 2/1995 | Grinberg et al. ............. 250/331 |
| 5,497,266 A * | 3/1996 | Owen ......................... 359/353 |
| 5,519,529 A | 5/1996 | Ahearn et al. |
| 5,555,324 A | 9/1996 | Waxman et al. |
| 5,683,831 A * | 11/1997 | Baril et al. .................... 429/96 |
| 5,726,671 A * | 3/1998 | Ansley et al. .............. 320/119 |
| 5,808,329 A | 9/1998 | Jack et al. |
| 5,808,350 A | 9/1998 | Jack et al. |
| 5,847,879 A | 12/1998 | Cook |
| 6,075,661 A * | 6/2000 | Gross et al. ................. 359/819 |
| 6,088,165 A | 7/2000 | Janeczko et al. |
| 6,141,146 A | 10/2000 | Owen, Jr. et al. |
| 6,195,206 B1 * | 2/2001 | Yona et al. .................. 359/630 |
| 6,292,293 B1 * | 9/2001 | Chipper ...................... 359/356 |
| 6,335,526 B1 * | 1/2002 | Horn .......................... 250/332 |
| 6,379,009 B1 * | 4/2002 | Fergason ...................... 353/28 |
| 6,646,799 B1 * | 11/2003 | Korniski et al. ............. 359/407 |
| 6,781,127 B1 * | 8/2004 | Wolff et al. ................. 250/332 |

* cited by examiner

*Primary Examiner*—David Porta
*Assistant Examiner*—Shun Lee

(57) ABSTRACT

An infrared imaging device combines two sensors, each sensor sensitive to a different spectral range of infrared radiation. Both sensors are combined in a single camera sharing one of three common optical apertures, thus parallax is eliminated between the sensors. Further, a display device is aligned along an optical axis in common with the camera eliminating parallax between the display and camera. Images from the first sensor, the second sensor, or both sensors may be viewed optically and/or electronically. The device is handheld, or mountable on a headgear such as a helmet. When mounted on headgear, the display is viewable by directing the operator's gaze upward, thus the display does not interfere with an operator's straight and downward sight. The image can be sent to a remote display by a wireless transceiver, and waterproof, fireproof, vibration/impact resistance, and hot/cold weather resistance are achieved using a high strength plastic enclosure with foam insert.

10 Claims, 10 Drawing Sheets

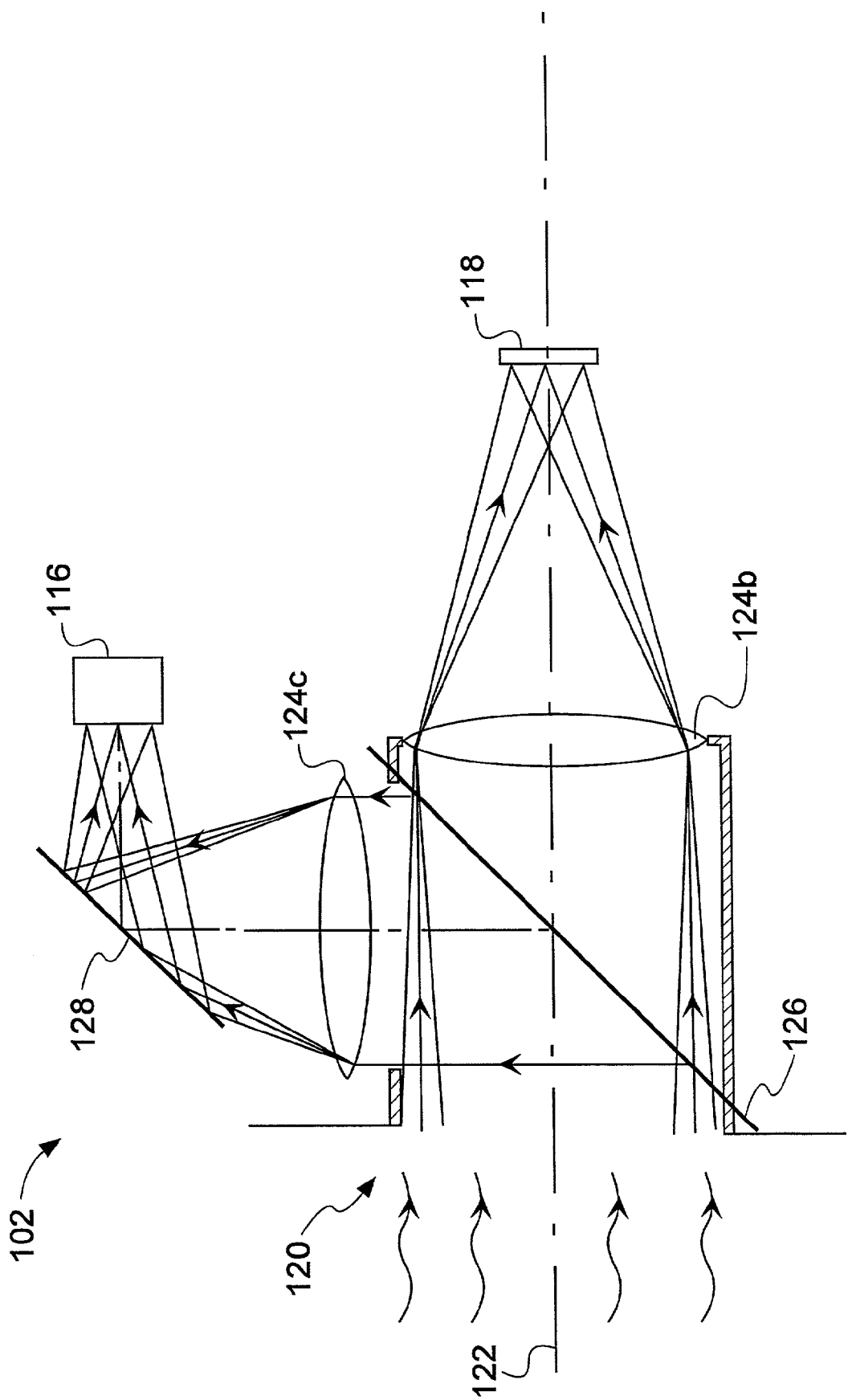

IMAGE INTENSIFIER AND LWIR FUSION/COMBINATION SYSTEM

CROSS-REFERENCE TO RELATED APPLICATIONS

This application claims the benefit of U.S. Provisional Application No. 60/224,189 filed Aug. 9, 2000, which is incorporated herein by reference.

STATEMENT REGARDING FEDERALLY SPONSORED RESEARCH OR DEVELOPMENT

This invention was made with government support under Contracts No. USZA22-00-P-0006 and No. USZA22-00-P-0029 awarded by U.S. Special Operations Forces. The Government has certain rights in this invention.

BACKGROUND OF THE INVENTION

The present invention relates in general to an infrared sensor device and in particular to a handheld or headgear mountable infrared sensor device capable of displaying fused or mixed radiation from infrared and other spectral sensors.

As is well known, light absorption properties of the atmosphere define several frequency bands that are favorable to the transmission of light without undue absorption. Some of these frequency bands define spectral ranges that provide useful information for aiding in certain aspects of night vision. Generally, these spectral ranges may be described as the visible (VIS) band (approximately 0.4 μm-0.76 μm), the near infrared (NIR) band (approximately 0.76 μm-1.1 μm), the short wave infrared (SWIR) band (approximately 1.1 μm-3 μm), the medium wave infrared (MWIR) band (approximately 3 μm-7 μm), and the long wave infrared (LWIR) band (approximately 7 μm-18 μm). The VIS, NIR and SWIR bands are dominated by reflected light such as starlight. The LWIR band is dominated by emitted light, or thermal energy. The MWIR band has both reflected and emitted radiation, and exhibits approximately equal parts of reflected light and emitted light during the day.

Infrared sensors are devices sensitive to radiation in a limited specral range of infrared radiation, typically from one of the NIR, SWIR, MWIR or LWIR bands. Such sensors have been used for night vision applications. However, none of the prior night vision systems provide satisfactory performance for field use under harsh environmental conditions. For example, one infrared device utilizes an LWIR sensor and a display screen to detect and display thermal energy. However, the LWIR sensor requires cryogenic cooling. This is required to maintain the sensor at a stable and high quantum efficiency. Otherwise, the display is distorted by temperature fluctuations of the sensor itself. Cooling adds substantial cost and bulk to the LWIR sensor thus limiting the applications where cryogenically equipped LWIR sensors may be used. Yet other night vision systems employ NIR sensors, such as an image intensifier (I2). Although the resolution of I2 is much better than LWIR, it does not function is well as the LWIR sensor in harsh environmental conditions such as in fog, haze, smoke, and complete darkness.

Therefore, there is a need for an infrared sensor system that produces a good resolution image, and is adaptable for use in harsh environments.

Further, there is a need for an infrared sensor system that take the advantages of both sensors and overcome the shortcomings of both sensors.

SUMMARY OF THE INVENTION

The present invention overcomes the disadvantages of previously known infrared imaging systems by providing an infrared imaging device that fuses/combines two sensors, each sensor is sensitive to a different spectral range of infrared radiation. Both sensors are combined in a single camera sharing a common aperture, and as such, parallax is eliminated between the sensors. Further, a display device is provided along an optical axis in common with the camera, thus eliminating parallax between the display and camera. Images from the first sensor, the second sensor, or both sensors may be viewed on the display. The infrared imaging fusion system of the present invention is mountable on a headgear such as a helmet or the like, and is arranged on the headgear such that the display is viewable by an operator wearing the headgear by directing the operator's gaze upward so that the display does not interfere with an operator's straight ahead and downward line of sight. The present invention can also be used with other mounting methods based upon the specific application of use, or in a handheld fashion.

In accordance with one embodiment of the present invention, an infrared imaging device comprises a display device and a camera. The camera comprises an objective lens, a beam splitter, a first sensor and a second sensor. The beam splitter is arranged to receive radiation passed through the common optical aperture (objective lens), passing/reflecting radiation in the first spectral range to the first sensor, and reflecting/passing radiation in the second spectral range to the second sensor. The first sensor has a first output representing an image of the radiation passing through the aperture filtered into a first spectral range. Likewise, the second sensor has a second output representing an image of the radiation passing or reflecting through the aperture filtered into a second spectral range. The camera and the display device are aligned along a common optical axis, and the display device is arranged to allow selective viewing of the first output, the second output, or both the first and second outputs.

The objective lens is capable of allowing radiation in at least the first and second spectral ranges to pass therethrough. For example, a lens constructed from the elements $ZnSe$—$Ge_{33}As_{12}Se_{55}$—$ZnSe$ may be used where the first and second sensors comprise near infrared and long wave infrared sensors.

Alternatively, the camera may further comprise a first objective lens behind the beam splitter and in front of the first sensor capable of allowing radiation in at least the first spectral range to pass therethrough, and a second objective lens between the beam splitter and the second sensor capable of allowing radiation in at least the second spectral range to pass therethrough.

In addition, the camera may comprise a concave reflective mirror combining with a flat or convex mirror to form an objective lens and a beam splitter. The beam splitter passes/reflects the first spectral range to the first sensor and reflects/passes the second spectral range to the second sensor.

The infrared imaging device may optionally include a beam combiner arranged to optically combine the first and second outputs into a third output, and an eyepiece for optically viewing the first output, the second output, or the third output. The eyepiece may be either monocular or binocular. The eyepiece is mountable to headgear such that the eyepiece aligns with the eye of an operator. The infrared imaging device further comprises a viewing device mountable to the headgear such that, when the headgear is worn by an operator, the viewing device is positioned just above the eyes of an operator, and the viewing device may be viewed by the operator by looking upwards towards the viewing device.

The infrared imaging device may electronically combine two image outputs together on the display. For example, the viewing device is capable of selectively displaying the first output, the second output, or a fused image from the first and second outputs, wherein the fused image comprises at least a portion of the first output with at least a portion of the second output. Further, the viewing device may be capable of selectively displaying the first and second outputs independently such that the first output is viewed on one portion of the viewing device, and the second output is displayed on a second portion of the viewing device. Additionally, the viewing device may be capable of displaying the first and second outputs such that one of the outputs is positioned inside the other (picture in picture).

The infrared imaging device is mountable to a headgear, and further comprises a first connector arranged to releasably secure the infrared imaging device to the headgear such that the bottom of the display is just above the eyes of an operator when the headgear is worn. The operator may view the display device by looking upwards. Normal vision is not blocked when looking generally straightforward or down. A second connector is arranged to releasably secure a power assembly to the headgear, and at least one interconnecting cable couples the power assembly to the sensor assembly. Other types of mounting are possible within the spirit of the present invention. In addition, the present invention may be used in a handheld fashion.

In accordance with another embodiment of the present invention, an infrared imaging device comprises an aperture arranged to allow entry of radiation. A beam splitter is arranged to receive the radiation passed through the aperture and reflect/pass near infrared radiation to an objective lens for a near infrared sensor, and pass/reflect long wave infrared radiation to an objective lens for a long wave infrared sensor. The near infrared sensor has a first output representing an image of the radiation passing through the aperture filtered into the near infrared spectral range, and the long wave infrared sensor has a second output representing an image of the radiation passing through the aperture filtered into the long wave infrared spectral range.

A combiner is arranged to optically/electronically combine the first and second outputs into a fused image and display the first output, the second output, or the fused output into an eyepiece/display.

A display device is mountable to a headgear such that, when an operator wears the headgear, the display device is positioned just above the eyes of an operator, and the operator may view the display device by looking upwards. The display device allows selective viewing of the first output, the second output or the first and second outputs simultaneously, such as described herein with reference to previously described embodiments.

In accordance with yet another embodiment of the present invention, an infrared imaging device comprises an aperture arranged to allow entry of radiation. A reflective mirror combining with a convex or flat mirror is arranged as an objective lens to receive the radiation passed through the aperture. A beam splitter is arranged to pass/reflect near infrared radiation to a near infrared sensor, and reflect/pass long wave infrared radiation to a long wave infrared sensor. The near infrared sensor has a first electrical output and a first converted optical output, the first electrical and optical outputs each representing an image of the radiation passing through the aperture filtered into the near infrared spectral range.

Likewise, the long wave infrared sensor has a second electrical output and a converted second optical output, the second electrical and optical outputs each representing an image of the radiation passing through the aperture filtered into the long wave infrared spectral range. A combiner optically/electronically combines the first and second optical/electronic outputs into an optically/electronically fused image providing a fused optical/electronic output. An eyepiece/display allows selective viewing of the first optical/electronic output, the second optical/electronic output, or the fused optical/electronic output.

A display device is aligned along a common optical axis with the aperture, and comprises a viewing device mountable to a headgear such that, when an operator wears the headgear, the viewing device is positioned just above the eyes of an operator. The operator may view the viewing device by looking upwards towards the viewing device, such as described in previous embodiments herein. The viewer is adjustable to fit both eyes. Other types of mounting are possible within the spirit of the present invention. In addition, the present invention may be used in a handheld fashion.

Accordingly, it is an object of the present invention to provide an infrared imaging system that fuses/combines multiple sensors into one portable system that eliminates problems associated with parallax.

It is a further object of the present invention to provide an infrared imaging system that is light-weight yet durable enough for portable uses.

It is a further object of the present invention to provide an infrared imaging system that is economical to manufacture, and simple in construction.

Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which:

FIG. 4A is a diagrammatic illustration of a second single aperture arrangement using a common beam splitter for the dual sensor camera according to one embodiment of the present invention, where an objective lens is provided for each sensor;

DETAILED DESCRIPTION OF THE PREFERRED EMBODIMENTS

Figure 1A:
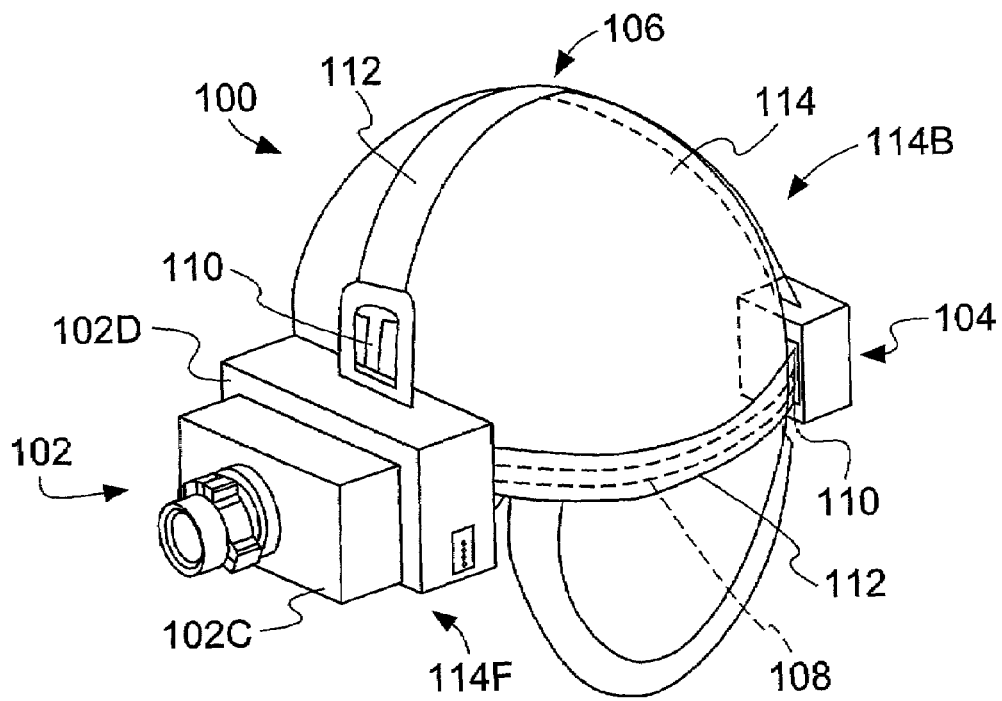
FIG. 1A is an illustration of the infrared imaging system according to one embodiment of the present invention mounted to a helmet.

In the following detailed description of the preferred embodiments, reference is made to the accompanying drawings that form a part hereof, and in which are shown by way of illustration, and not by way of limitation, specific preferred embodiments in which the invention may be practiced. It will be appreciated that these are diagrammatic figures, and that the illustrated embodiments are not shown to scale. Further, like structure in the drawings is indicated with like reference numerals.

An optical device according to a first embodiment is illustrated in FIG. 1A. The infrared imaging system 100 comprises a sensor assembly 102, a power assembly 104, and an interconnect assembly 106. The sensor assembly 102 comprises a camera 102C and a display device 102D arranged as an integral unit. However, the camera 102C and the display device 102D need not be integral as more fully explained herein. The power assembly 104 supplies power to the sensor assembly 102, and may serve as a balancing weight and a housing for one or more circuit components of infrared imaging system 100. For example, two 6 volt rechargeable Lithium, NiCd, or nickel metal batteries may be used in the power assembly to provide power to the sensor assembly 102 for over 4 hours, depending upon the choice of components utilized. This eliminates the need for an extra battery pack to be worn around the waist. As an optional accessory, a belt pack can be equipped with a Lithium ion battery box providing up to 32 hours of additional use before refreshing the batteries is required. Alternatively, where a battery is incorporated into the sensor assembly 102, the power assembly 104 may be used to provide auxiliary or additional power, or may be omitted.

The interconnect assembly 106 includes the necessary wiring 108 to interconnect the sensor assembly 102 to the power assembly 104. Further, the interconnect assembly 106 includes the required brackets 110 and harness 112 to connect the sensor assembly 102 and the power assembly 104 to a piece of headgear 114. The headgear 114 can be any type of suitable head worn gear including helmets, hats, goggles, and the like. As illustrated in FIG. 1A, the wiring 108 is illustrated in dashed lines to indicate that the wiring 108 is underneath the harness 112. It will be appreciated by those skilled in the art that the exact placement of the wiring can vary depending upon the configuration of the helmet 114, and the harness 112. For example, the wiring 108 may be encased in a waterproof cable that runs under the headgear 114. The wiring need not be positioned under a harness 112, and can be positioned in any number of ways so long as a suitable connection is made between the sensor assembly 102 and the power assembly 104. Preferably, the wiring 108 is waterproof as well as fireproof.

The brackets 110 and harness 112 secure the sensor assembly 102 to the front portion 114F of the headgear 114. Additionally, brackets 110 and harness 112 may further secure the power assembly 104 to the headgear 114. As illustrated in FIG. 1A, the power assembly 104 is mounted to the back portion 114B of the headgear 114. This is a preferable arrangement because the power assembly 104 provides a counter-balance to the sensor assembly 102. However, the exact placement of the power assembly 104 can vary within the spirit of the present invention. For example, the power assembly may be interconnected to a belt pack or other suitable location, so long as the power assembly 104 is secured to the operator of the infrared imaging system 100. Further, backup, redundant, auxiliary or additional power assemblies may be included, but are not required to practice the present invention.

The brackets 110 may vary in type and configuration, and will depend largely on the mount supplied on the sensor assembly 102, and the power assembly 104. Further, some headgear includes standardized mounting brackets and harnesses. Where the headgear 114 provides suitable mounting devices, the brackets 110 and harness 112 may be eliminated from the interconnect assembly 106. For example, certain military helmets include a standard AN/AVS-6 or AN/PVS-15 helmet mount. Further, certain helmets include an AN/AVS-6 harness. Under this circumstance, the sensor assembly 102 may include a spring loaded, or dovetail mount similar to the standard AN/PVS-7C to eliminate the need for a special, or additional bracket 110. Further, the bracket 110 may supply enhanced functionality such as the ability to adjust the positioning of the sensor assembly 102 relative to the bracket 110. For example, the bracket 110 may provide lateral, vertical or rotational movement of the sensor assembly 102. When the operator wears the headgear 114, it is important that the sensor assembly 102 does not block normal vision, even when the user is wearing an oxygen mask or gas mask.

Figure 1B:
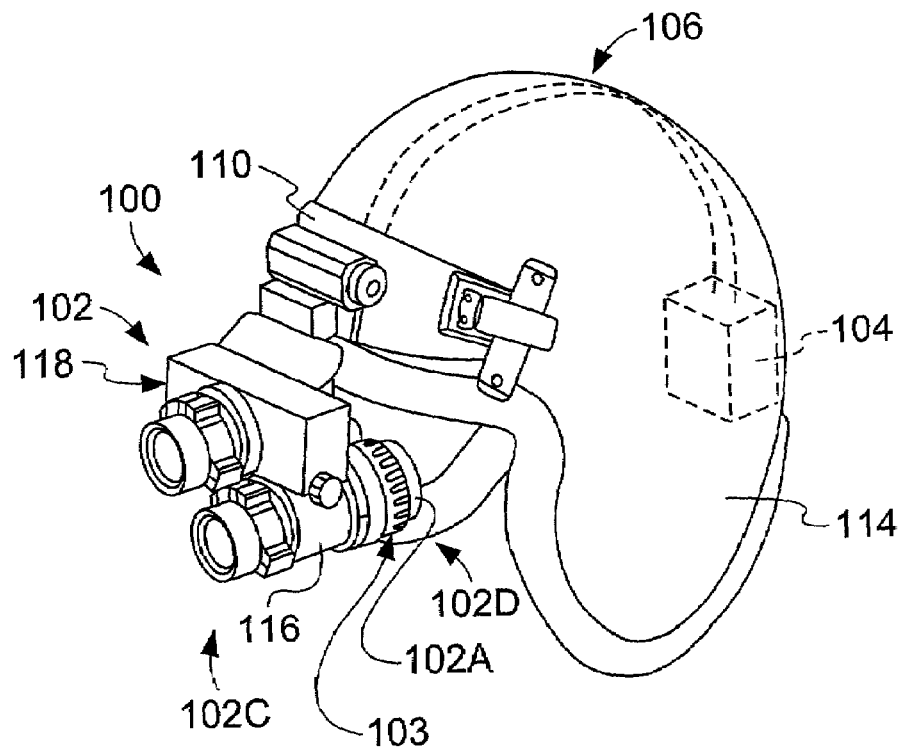
FIG. 1B is an illustration of the infrared imaging system according to one embodiment of the present invention, including an optional optical viewer, mounted to a helmet.

Referring to FIG. 1B, a second variation for the bracket 110 is shown. It will be observed that the bracket 110 incorporates any geometry suitable to secure the sensor assembly 102 to the headgear 114. Further, the sensor assembly 102 may include an optical viewer 102A for a monocular view. For a binocular view, a second optical viewer (not shown) may optionally be incorporated. When the target image is to be displayed electronically on a screen only, the optical viewer 102A is not required. The present invention contemplates viewing a target image using both a first sensor 116 and a second sensor 118. As illustrated in FIG. 1B, the sensor device 102 is implemented by stacking an infrared camera on an image intensifier. The infrared image from its own display (quarter VGA or full VGA) is optically fused to the image intensifier image through a beam combiner and shown on the optical viewer 102A.

Figure 2:
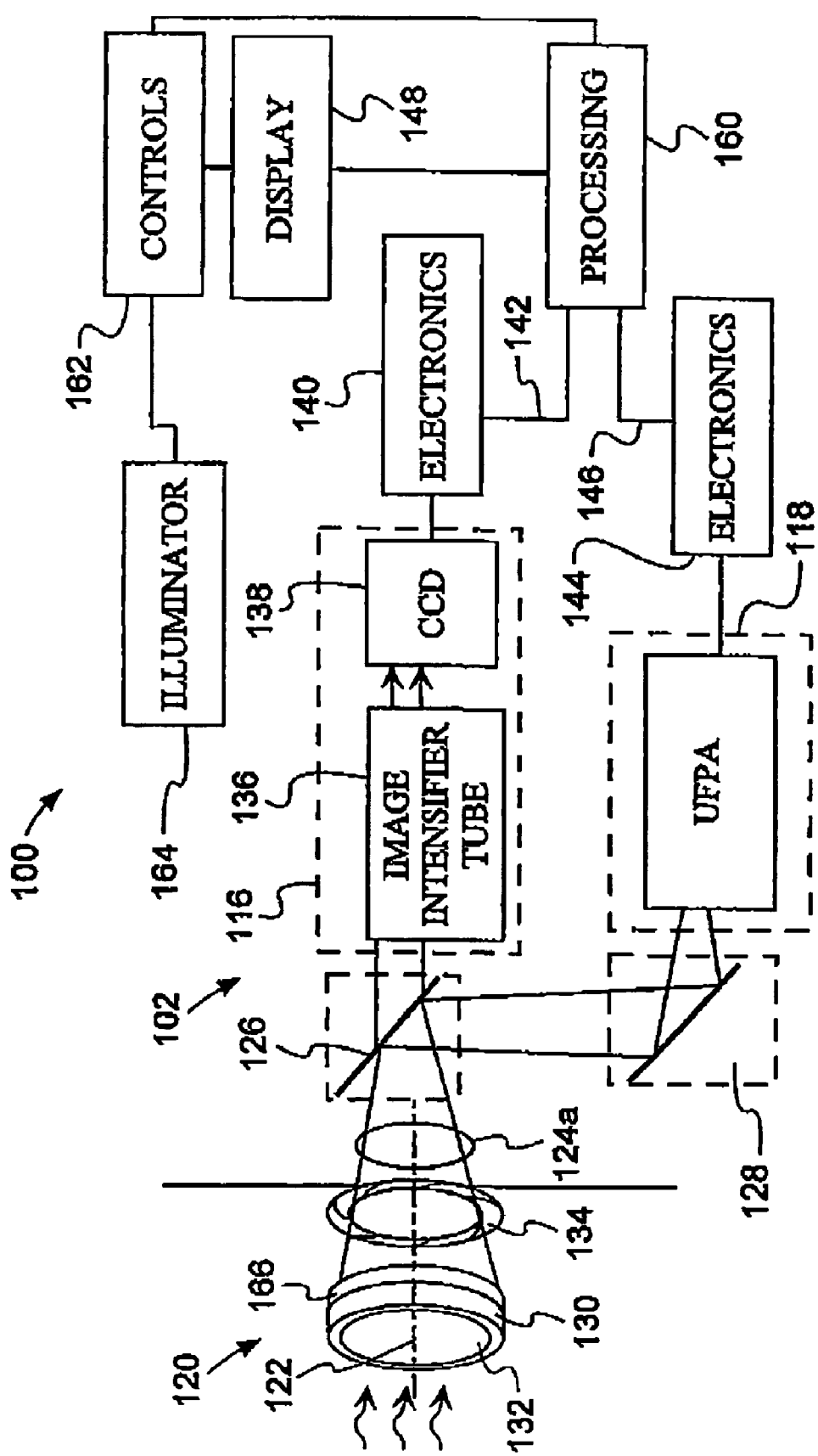
FIG. 2 is a diagrammatic illustration of the infrared imaging system according to one embodiment of the present invention.

As illustrated in FIG. 2, the sensor assembly 102 includes first and second sensors 116, 118. Although the present invention will be described with reference to the first sensor 116 comprising a sensor sensitive to radiation in the VIS and NIR spectral ranges, and the second sensor 118 comprising a sensor sensitive to radiation in the LWIR spectral range, it should be appreciated by those skilled in the art that any combination of sensors may be used, and that each of the first and second sensors 116, 118, herein after referred to as NIR sensor 116 and LWIR sensor 118, may include suitable hardware sensitive to radiation in one of the VIS, NIR, SWIR, MWIR or LWIR bands.

Figure 3A:
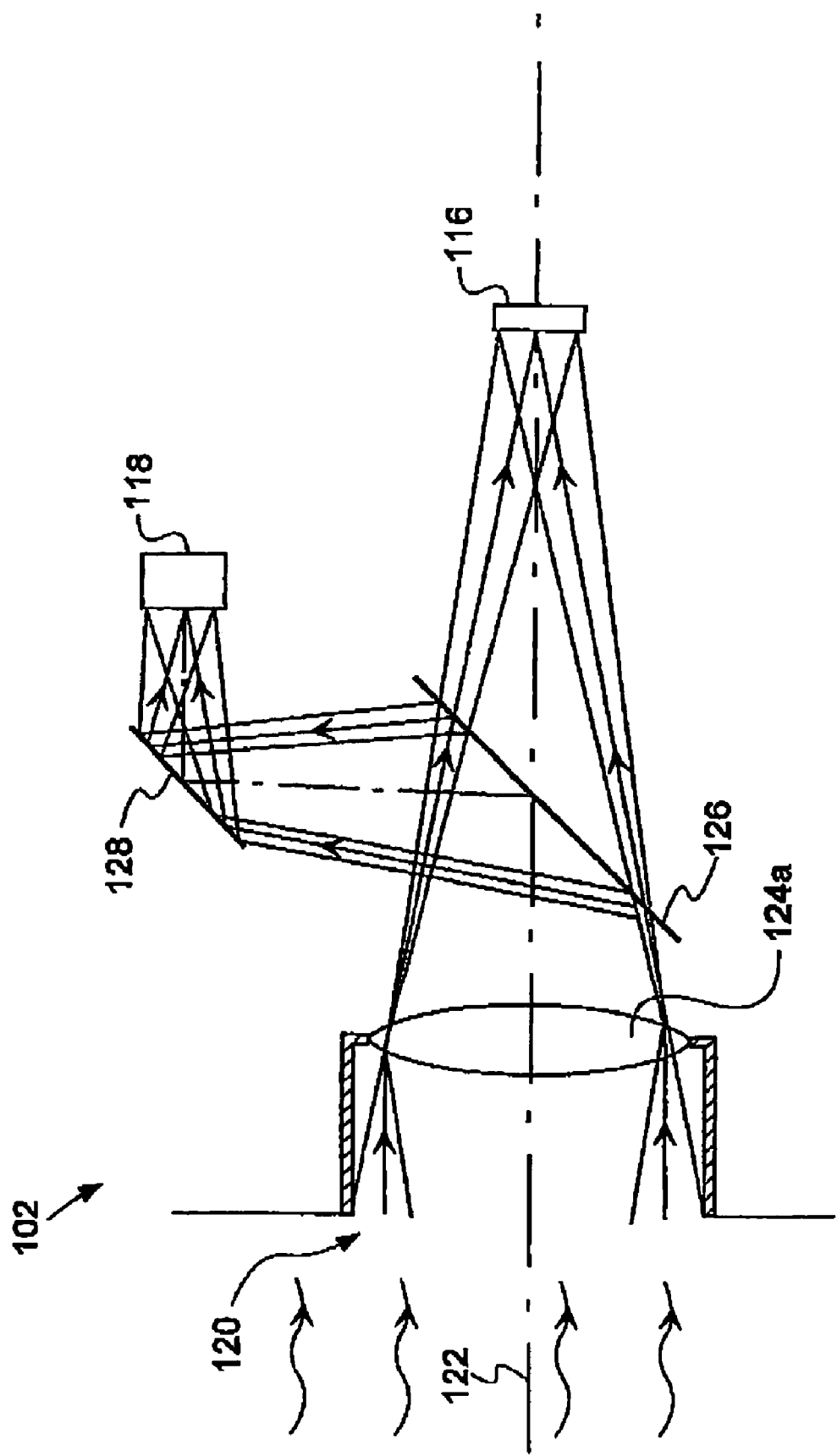
FIG. 3A is a diagrammatic illustration of a first single aperture arrangement for the dual sensor camera according to one embodiment of the present invention, where each of the sensors share a common objective lens.

As illustrated in FIGS. 2 and 3A, radiation propagating along an input axis 122 enters the sensor assembly 102 at the aperture 120 and passes through a common optical aperture, such as a single objective lens 124a. Parallax between the NIR sensor 116 and the LWIR sensor 118 is eliminated by allowing both the NIR and LWIR sensors 116, 118 to share a single aperture 120. It should be appreciated by those skilled in the art that the FIGS. 2-4B illustrate an infinite target on the optical axis, however in practice, a finite target may be viewed.

A typical NIR sensor uses a common glass lens that cannot pass radiation in the LWIR spectral range. On the contrary, a typical LWIR sensor uses a transparent objective lens fabricated from crystal germanium (Ge) that cannot pass radiation in the NIR spectral range.

The objective lens 124a however, has a broad spectrum that is transmissive to VIS and NIR as well as LWIR spectral ranges. The VIS and NIR spectral ranges are approximately from 0.4 µm to 1.1 µm and the LWIR spectral range is from about 7 µm to 18 µm. As such, the objective lens 124a has a sufficiently broad bandwidth to capture suitable amounts of radiation in the VIS, NIR and LWIR spectral ranges i.e. 0.4 µm to 18 µm. However, the objective lens 124a need not cover precisely the entire VIS, NIR and LWIR bandwidth. For example, suitable optical materials for the objective lens 124a may have a bandwidth of 0.48 ||m to 12 µm. This is acceptable in part, because the LWIR sensor may only be sensitive to 8 µm 12 µm.

While not meant to be exhaustive, examples of materials suitable for constructing the objective lens 124a include ZnSe (0.48 µm to 22 µm), $Ge_{33}As_{12}Se_{55}$ (0.5 µm to 16 µm) and $Ge_{28}Sb_{12}Se_{60}$ (0.5 µm to 16 µm). Because the above materials have a close refraction index (about 2.5) they are easily combined to make a lens. A preferred objective lens 124a comprises a combination of three elements (ZnSe—$Ge_{33}As_{12}Se_{55}$—ZnSe). Such an objective lens has good chemical, mechanical and thermal performance. An example of suitable construction characteristics for the objective lens 124a includes a focal length of f=16 mm, an f number F=1.0, field of view (FOV) of 54 degrees×42 degrees, and a Modulation Transfer Function (MTF) of 60% on the center, and 30% on the edge. These parameters, while only illustrative, enable the objective lens 124a to be compatible with current commercially available LWIR and NIR sensors. It will be appreciated that other parameters are possible. The objective lens 124a should also further exhibit a sufficient back working distance for the sensors utilized. For example, a back working distance b=13.2 mm allows suitable room to further insert a chopper or other necessary components for the LWIR sensor 118 as more fully explained herein.

The preferred composite construction of the objective lens 124a (ZnSe—$Ge_{33}As_{12}Se_{55}$—ZnSe) solves many problems associated with a typical Ge lens. Notably, the Ge lens is expensive and further may turn opaque when the environmental temperature rises to 120 degrees Celsius. The objective lens 124a according to the preferred construction may withstand temperatures to 374 degrees Celsius prior to turning opaque, and has about ⅓ the cost of the Ge lens.

Referring generally to FIGS. 2 and 3A, an optical aperture such as a beam splitter 126 that is reflective of radiation in the LWIR spectral range, and transmissive of radiation in the VIS and NIR spectral ranges is mounted behind the objective lens 124a. The beam splitter 126 reflects radiation in the LWIR spectral range from the objective lens 124a towards the LWIR sensor 118. Similarly, the beam splitter 126 transmits radiation in the VIS/NIR spectral ranges to the NIR sensor 116. Depending upon the orientation of the LWIR sensor 118 with respect to the beam splitter 126, a reflective surface such as a mirror 128 is mounted between beam splitter 126 and LWIR sensor 118 such that radiation in the LWIR spectral range entering through the aperture 120 passes through the objective lens 124a, is reflected in turn by the beam splitter 126, then by the mirror 128 towards LWIR 118. A beam splitter as used herein is any structure, such as an optical aperture, that is transmissive of radiation in at least a portion of one spectral range, and reflective of radiation in at least a portion of a second spectral range different from the first spectral range. For example, the beam splitter 126 may be formed from a dielectric material deposited on a glass substrate, or otherwise coated by a transmissive waveband filter of 0.48 µm-1.1 µm and a reflective waveband filter of 8 µm-12 µm.

The beam splitter 126 is preferably fully transmissive of radiation in the VIS and NIR spectral ranges, and fully reflective of radiation in the LWIR spectral range. However, it is within the spirit of the present invention to construct the beam splitter 126 so as to be only partially transmissive and/or partially reflective. Further, those skilled in the art will appreciate that the NIR and LWIR sensors 116, 118 may be reversed such that the beam splitter 126 is reflective of radiation in the VIS/NIR spectral ranges, and transmissive of radiation in the LWIR spectral range. It will be observed that the NIR sensor 116 and the LWIR sensor 118 are arranged such that they share the same field of view and are focused along the common input axis 122. Therefore, NIR and LWIR sensors 116, 118 generate image data representative of the NIR and the LWIR radiation, respectively, emanating from the same scene. As such, parallax between the NIR sensor 116 and the LWIR sensor 118 is eliminated. Further, because the NIR sensor 116 and the LWIR sensor 118 shares the same objective lens 124a, there is unity of magnification between the NIR and LWIR sensors 116, 118, thus improving the readability of sensor data.

Figure 3B:
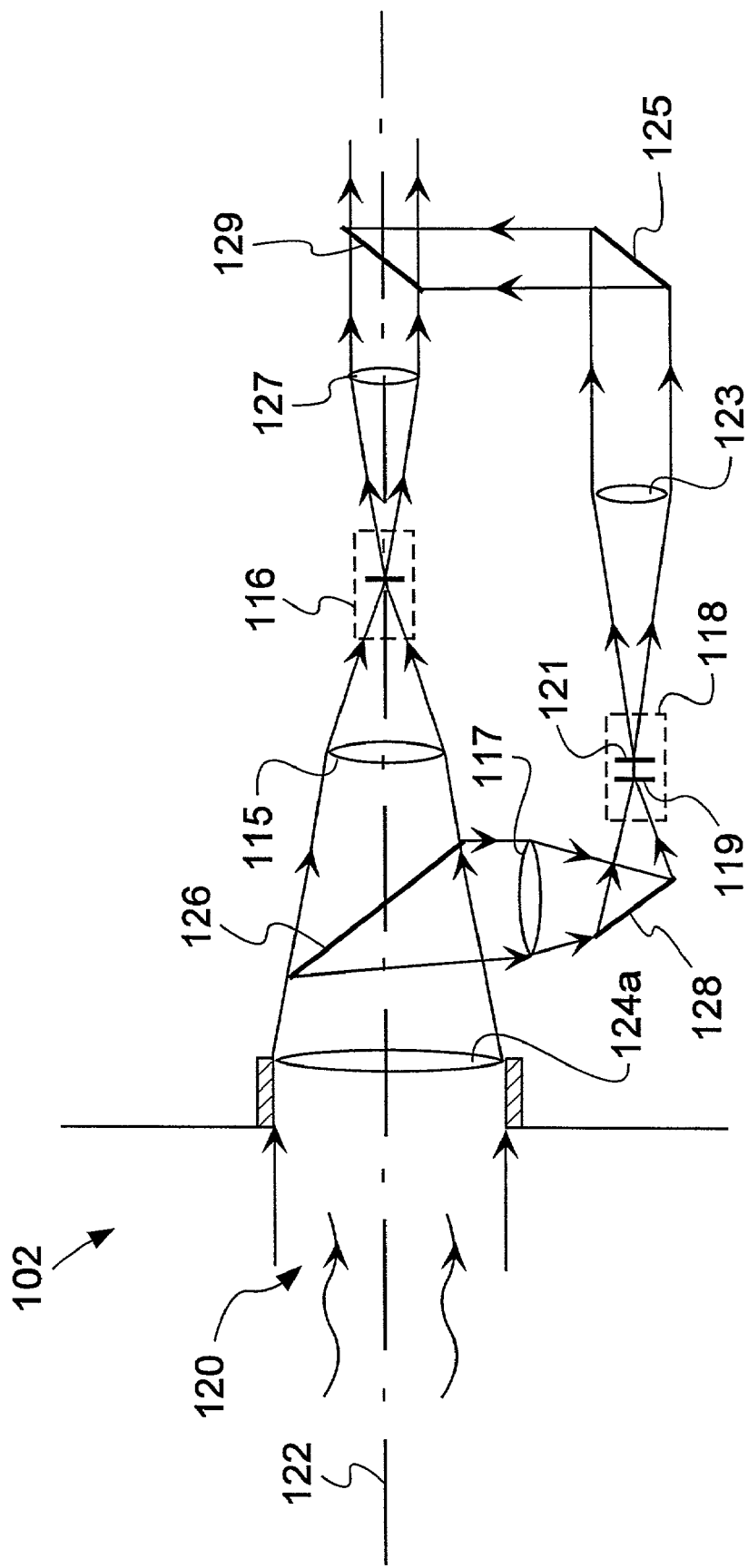
FIG. 3B is a diagrammatic illustration of a first single aperture arrangement for the dual sensor camera according to one embodiment of the present invention, where each of the sensors share a common objective lens, and where the sensor outputs are optically fused.

The outputs of the NIR and LWIR sensors 116, 118 may optionally be fused together for viewing as illustrated in FIG. 3B. Radiation propagating along input axis 122 enters the sensor assembly 102 at aperture 120 and passes through the single objective lens 124a as described above. The beam splitter 126 as illustrated in FIG. 3B is transmissive of radiation in the VIS/NIR spectral ranges and reflective of radiation in the LWIR spectral range. Radiation in the VIS/NIR spectral ranges passes through lens 115 before entering the NIR sensor 116. The VIS/NIR radiation exits the NIR sensor 116 as a visible image that is passed through lens 127. Lens 115 and 127 are optional, and are used to correct aberrations and achieve a high-resolution image. Construction of lenses 115 and 127 may be of a normal glass material. The NIR sensor 116 is preferably implemented as an image intensifier tube or a low, light level Charge Couple Device (CCD).

Radiation in the LWIR range is reflected by the beam splitter 126 and optionally passes through a relay lens 117, is reflected by a mirror 128, and enters the LWIR sensor 118. The LWIR sensor 118 in this instance comprises an uncooled focal plane array (UFPA) 119 and a miniature display 121, such as a miniature active matrix liquid crystal display (LCD). The display 121 behind the UFPA 119 converts the electronic LWIR image to a visible image. It will be observed that other types of LWIR sensors 118 may be used so long as the LWIR sensor outputs a visible image. The image from the display 121 is projected or channeled through a lens 123, and is reflected by a mirror 125.

A beam combiner 129 is used to fuse or integrate the VIS/NIR radiation rendered visible by the NIR sensor 116, and the LWIR radiation rendered visible by the LWIR sensor 118. In a preferred structure, the peak responsive wavelength of the image intensifier tube used for the NIR sensor 116 is 0.85 µm. The image intensifier tube converts the radiation to green light at peak wavelength of 0.55 µm with very narrow bandwidth. The beam combiner 129 passes 100% green light 0.55 µm with a bandwidth of only +/−0.01 µm from the NIR sensor 116, and reflects all other visible light from the LWIR sensor 118. As such, high intensity images from both channels are achieved.

The use of lenses 115, 117, 123, and 127 allow for optically correcting aberrations and scaling images so that correct overlap of images can be achieved. After the common lens 124a the NIR and LWIR signals are processed independently through lenses 115 and 117 respectively, thus different materials can be used to correct aberrations within the limited bandwidths. That is, instead of attempting to correct aberrations across the entire 0.40 µm to 12 µm waveband by lens 124a alone, only the aberrations in the 0.4 µm to 1.1 µm waveband are corrected by lens 124a and lens 115 for the NIR sensor 116, and only aberrations in the 8 µm to 12 µm waveband are corrected by lens 124a and lens 117 for the LWIR sensor 118. This increases flexibility in selecting suitable materials and correcting aberrations. Further, the LWIR radiation that enters the LWIR sensor 118 may be converted to an electronic signal before being output as a visible image. This allows the use of signal processing and conditioning. For example, the image may be scaled, resolution of the image may be adjusted, and the signal may be filtered or otherwise manipulated.

Because visible images of the radiation in NIR and LWIR spectral ranges are optically combined, the sensor assembly 102 may optionally project the combined image directly onto the user's eye. As such, lens 127 serves as an eyepiece. The mirror 125 can be placed in the front or behind the lens 127 depending on the system structure. It will be observed that the use of a single lens 127 as an eyepiece allows the use of a monocular optical viewer such as that illustrated in FIG. 1B, or as a binocular optical viewer (not shown). The lens 127 (not shown in FIG. 1B) is housed within the optical viewer 102A. An optional focus knob 103 may further be provided to focus the image. Where a binocular view is desired, the image is copied, such as by reflecting the image through a prism, for example. The copied image is viewed through a second optical viewer (not shown). The optical viewers are positioned to suitably line up with the eyes of a user, and may include adjustments to allow a user to align the optical viewers as desired. Alternatively, a binocular optical viewer may comprise a second image intensifier tube, that is, the radiation is passed through two NIR sensors (not shown) as well as the LWIR sensor 118.

The transmittance of radiation in the NIR spectral range for the single objective lens 124a illustrated in FIGS. 3A and 3B may not be as good as that of glass. Further, in some circumstances, for example where an objective lens 124a according to the preferred construction cannot be manufactured, it may be desirable to use commercially available lenses.

FIG. 4A illustrates an alternative approach to the single aperture configuration shown in FIG. 3A. Radiation propagating along the input axis 122 enters the sensor assembly 102 at the aperture 120. It should be noted that the beam splitter 126 shown in FIG. 4A is transmissive of radiation in the LWIR spectral range, and reflective of radiation in the VIS/NIR spectral ranges. This is opposite of the arrangement shown in FIG. 3A where the beam splitter 126 is reflective of radiation in the LWIR spectral range, and transmissive of radiation in the VIS/NIR spectral ranges. This was purposefully presented in this way to further illustrate the independence of orienting the NIR sensor 116 and LWIR sensor 118.

Referring back to FIG. 4A, the beam splitter 126 is mounted between the aperture 120 and an optical aperture, such as objective lens 124b. The objective lens 124b need only be transmissive to radiation within the LWIR spectral range. Similarly, the beam splitter 126 reflects radiation in the VIS/NIR spectral ranges to an optical aperture such as objective lens 124c. The objective lens 124c need only be transmissive to radiation within the VIS/NIR spectral ranges.

It is preferable that the two objective lenses 124b and 124c are optically similar. The phrase optically similar is defined herein to mean that the two objective lenses 124b, 124c are constructed to include generally identical focal lengths, F-numbers, Field of view, MTF and back working distance. This will ensure that the NIR sensor 116 and LWIR sensor 118 depict images of the same scene. Depending upon the orientation of the NIR sensor 116 with respect to the beam splitter 126, a mirror 128 is mounted between beam splitter 126 and NIR sensor 116 such that radiation in the VIS/NIR spectral ranges entering through the aperture 120 is reflected by the beam splitter 126, passes through the objective lens 124c, and reflects off mirror 128 towards NIR sensor 116. Those skilled in the art will appreciate that the NIR and LWIR sensors 116, 118 may be reversed such that the beam splitter 126 is reflective of radiation in the LWIR spectral range, and transmissive of radiation in the VIS/NIR spectral ranges.

Figure 4B:
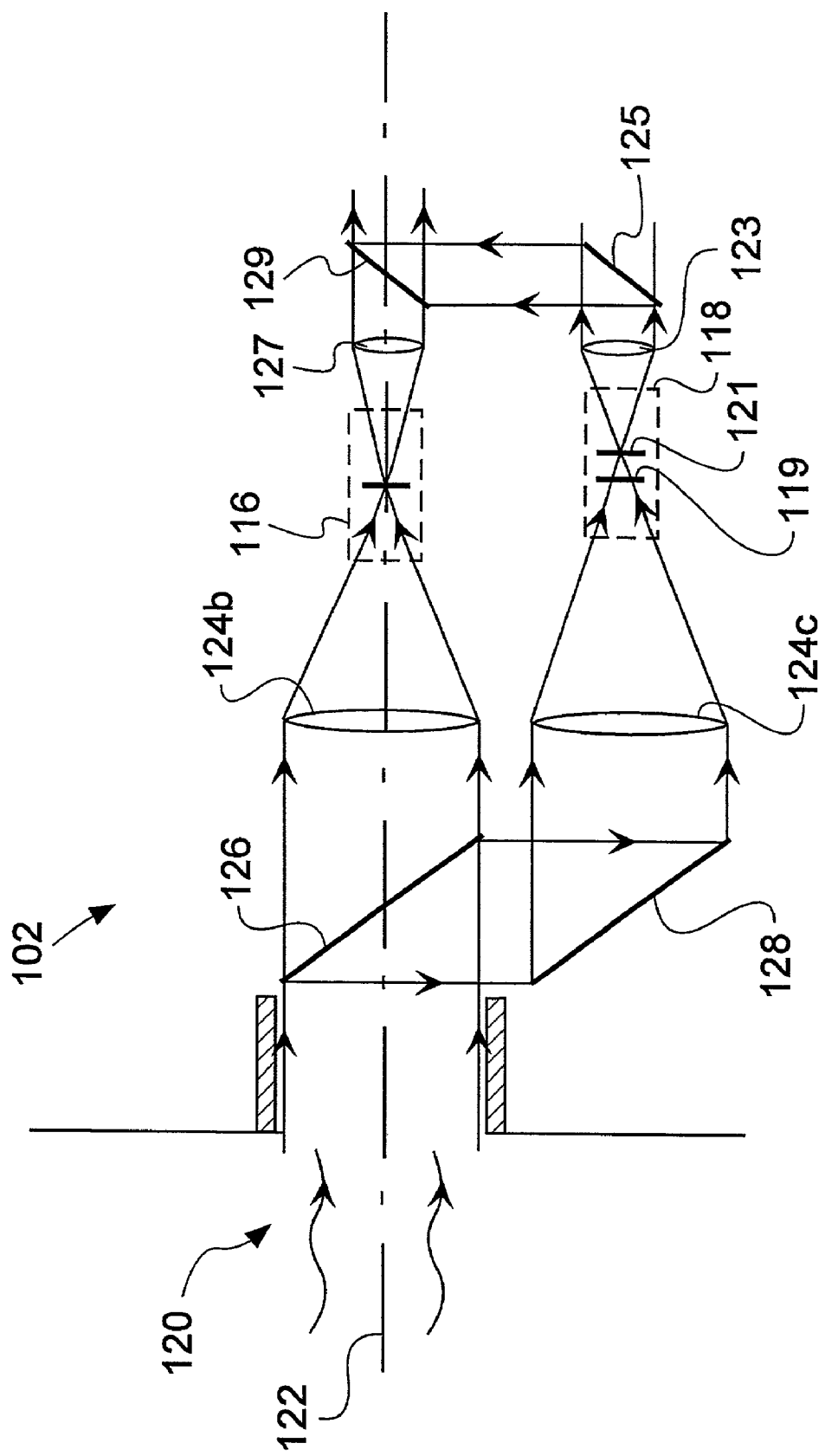
FIG. 4B is a diagrammatic illustration of a second single aperture arrangement for the dual sensor camera according to one embodiment of the present invention, where an objective lens is provided for each sensor, and where the sensor outputs are optically fused.

The images may further be combined optically as illustrated in FIG. 4B. Radiation enters the aperture 120 along a common optical axis 122. The beam splitter 126 is transmissive to radiation in the VIS/NTR spectral ranges, and reflective of radiation in the LWIR spectral range as illustrated. Radiation in the VIS/NIR spectral ranges are transmitted by the beam splitter 126 through the filtering objective lens 124b and into the NIR sensor 116, implemented as an image intensifier tube or LLL CCD for example.

Radiation in the LWIR spectral range reflected by the beam splitter 126 is further reflected by the mirror 128 and passes through the filtering objective lens 124c before entering the LWIR sensor 118. The optical fusion of the NIR and LWIR images is otherwise identical to that described with reference to FIG. 3B. That is, the LWIR sensor 118 converts radiation in the LWIR spectral range to a visible image which is transmitted through lens 123, reflected off of mirror 125 and is combined with a visible image of radiation in the NIR spectral range which has been output by the NIR sensor at the beam combiner 129.

Referring back to FIG. 2, although illustrated with the single objective lens 124*a* as described with reference to FIGS. 3A and 3B, it should be observed by those skilled in the art that the objective lens 124*a* may be replaced with objective lenses 124*b*, 124*c* as described with reference to FIGS. 4A and 4B. Radiation enters the aperture 120 passing through lens 130. An optical window 132 with a focusing knob 166 and a lens cap (not shown in FIG. 2) is provided to protect the sensor assembly 102. For example, a thin optical window of Si, Ge, or hot pressed ZnSe or ZnS is placed in the front of the objective lens 124*a*. The hot pressed ZnSe has good mechanical as well as thermal properties including a high resistance to delaminating, cracking, pitting, scratching and staining. The sensor assembly 102 may further include an iris 134 or other focus adjustments depending upon the types of NIR and LWIR sensors 116, 118 implemented.

NIR sensor 116 may be implemented as any sensor sensitive to VIS/NIR reflected radiation. As illustrated in FIG. 2, the NIR sensor 116 is implemented as an image intensifier ($I^2$) tube 136 coupled (optically or directly) to an electro-optic camera 138, such as a CCD. NIR sensor 116 may also be implemented as a LLL CCD camera such that an image intensifier tube may not be required to produce good quality imagery, for example, where the cost of $I^2$ is too expensive. Depending upon the selection of the NIR sensor 116, additional electronic circuitry 140 may be required to produce an NIR output signal 142 suitable to be displayed. The electronic output 142 may also be utilized to implement processing feature 160 of the NIR sensor 116 selected.

LWIR sensor 118 may be implemented as any sensor sensitive to LWIR reflected radiation. As illustrated in FIG. 2, the LWIR sensor 118 is implemented as an uncooled focal plane array (UFPA). The UFPA may be implemented for example using either $VO_x$ Microbolometer (MBT), Silicon Microbolometer, or Barium Strontium Titanate (BST) technology. For example, the MBT and BST may provide an image having a 320×240 pixel resolution, with either a 50 µm or 25 µm pixel size. The 25 µm pixel size allows a much smaller footprint where miniaturization is critical. The UFPA is arranged to include 320 row detectors and 240 column detectors, bump bonded to a silicon readout circuit using Indium bumps. The readout circuitry is a silicon IC that includes a sense amplifier (one per pixel), a column multiplexer switch (one per column), a column amplifier (one per column) and row multiplexer switch (one per row).

The UFPA is typically packaged in a ceramic enclosure and sealed in a vacuum with an optical window. A thermoelectric cooler or TE cooler (TEC) is integral to the package. The TEC stabilizes the detector temperature at a near room temperature (22 degrees Celsius for example for BST), thus a cryogenic cooling device is not necessary. Further, the TEC is not necessary when using a Si-Bolometer. The objective lens 124*a* has enough back working distance (for example 13.2 mm in this preferred embodiment) to insert not only the beam splitter 126, but also a chopper for BST or other alternating AC coupled devices.

Depending upon the selection of the LWIR sensor 118, additional electronic circuitry 144 may be required to produce an LWTR output signal 146 suitable to be processed. The electronic circuitry 144 may also be utilized to implement processing feature 160 of the LWLR sensor 118 as more fully described herein. It will be observed that the BST utilizes a chopper, and as such may produce an audible sound while in operation. Therefore, in applications where noise is a concern, the MBT may be utilized, or a suitable requirement may be applied to BST that the BST must be sufficiently quiet to be audibly undetectable, for example, at 1 meter in an open, desert ambient environment.

The single transmissive common objective lens with single beam splitter is illustrated with reference to FIGS. 3A and 3B. The single transmissive beam splitter with two objective lenses is illustrated with reference to FIGS. 4A and 4B.

Figure 5:
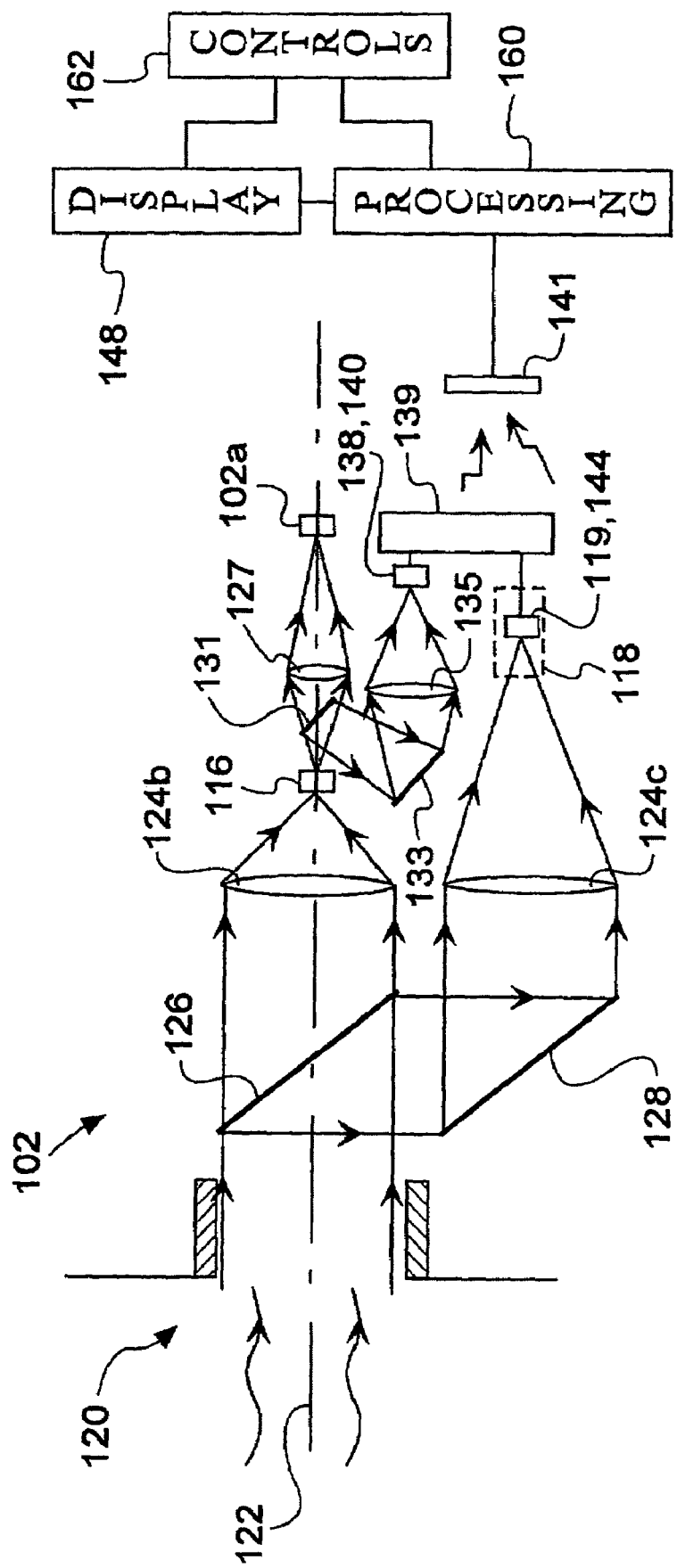
FIG. 5 is a diagrammatic illustration of a third single aperture arrangement for the dual sensor camera according to one embodiment of the present invention, incorporating a reflective objective lens.

Referring to FIG. 5, radiation propagating along an input axis 122 enters the sensor assembly 102 at the aperture 120. The beam splitter 126 reflects radiation in the LWIR spectral range from the mirror 128 towards the LWIR sensor 118. For example, radiation in the spectral range of 8 µm to 12 µm enters an uncooled focal plane array (UFPA) that converts the optical image to an electrical image. Similarly, the beam splitter 126 transmits radiation in the VIS/NIR spectral ranges to the NIR sensor 116. For example, the beam splitter 126 transmits radiation in the spectral range of 0.48 µm to 1.1 µm to an $I^2$ tube. A CCD camera behind the $I^2$ tube converts the optical image to an electrical image.

Both the output of the NIR sensor 116 and the LWIR sensor 118 are coupled to a data fusion board 139. The data fusion board 139 communicates with the display 141 for displaying the outputs. Further, the data fusion board 139 preferably includes circuitry to perform image processing such as inserting data, scaling images, aligning pixels, making image addition, subtraction, enhancements etc. As explained more fully herein, the images may be displayed on display 141 (such as LCD) through wire or wireless transceiver. The image combination can be picture in picture, overlaid, fused or otherwise mixed, the images may be viewed independently, or side by side.

It shall be appreciated that other viewing options may be used within the spirit of the present invention.

Figure 6A:
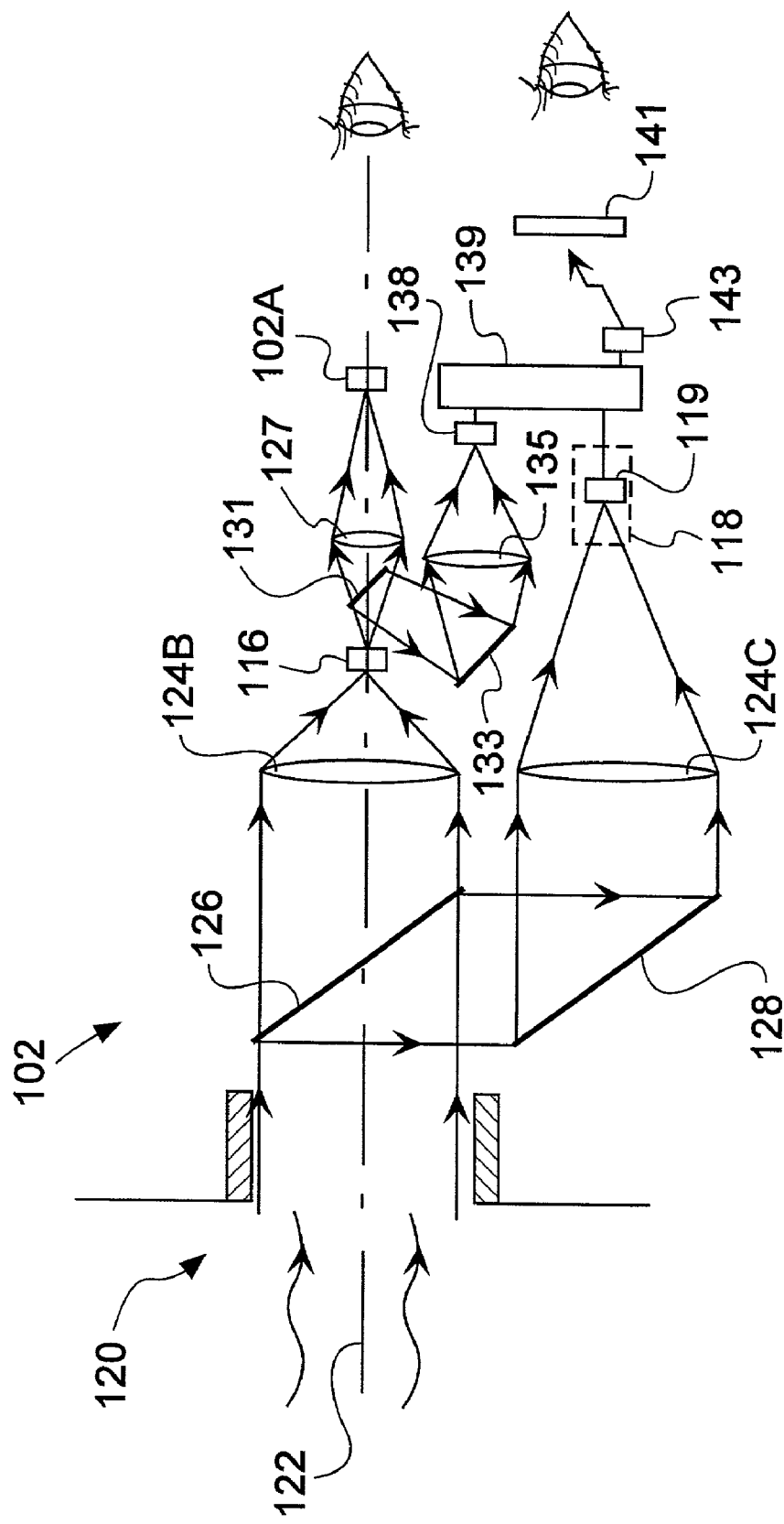
FIG. 6A is a diagrammatic illustration of the infrared imaging system according to one embodiment of the present invention illustrating an alternative embodiment for the display of the images where a near infrared image from a first sensor may be viewed optically, and may be also fused with a long infrared image from a second sensor on a display electronically.

Referring to FIG. 6A, the sensor assembly 102 may be arranged to provide both an optical view of the target image as well as an electronic view of the target image. While FIG. 6A illustrates the beam splitter embodiment, any of the embodiments disclosed herein, including the common objective lens may be used, so lone as a common aperture is used for both sensors 116, 118 as more fully described herein.

As described more fully above, radiation propagating along the input axis 122 enters the sensor assembly 102 at aperture 120. Radiation in the VIS/NIR spectral ranges are transmitted by beam splitter 126, passes through the objective lens 124*b* and into the NIR sensor 116 (such as an image intensifier). The image exits the NIR sensor 116 and passes through a splitter 131 where a copy of the image is transmitted through the lens 127 to the optical viewer 102A. Therefore, high resolutions can be maintained.

A second copy of the image from the NIR sensor 116 is reflected off mirror 133, and is transmitted through lens 135 to a CCD camera 138. It will be observed that the splitter 131 may be implemented as a beam splitter, a prism or other similar device capable of duplicating an optical image. For example, the splitter 131 is used such that 80% of the radiation is imaged upon the user's eye through lens 127 and optics viewer 102A. The remaining 20% of the radiation is reflected off of the mirror 133, through lens 135 and onto the charge coupled device (CCD) 138. Camera 138 converts the optical image to an electronic image. The output of the CCD is coupled to data fusion, and other processing circuitry 139.

Radiation in the LWIR spectral range is reflected by the beam splitter 126, reflected by the mirror 128, transmitted through the objective lens 124c and enters the LWIR sensor 118. The LWIR sensor as illustrated in FIG. 6A will not have an optically viewed component. As such, a device such as display device 121 as illustrated in FIGS. 3B and 4B is not required. However, the LWIR sensor 118 includes a UFPA 119 or other similar device capable of converting radiation in the LWIR spectral range to an electronic signal. Further electronics may also be included for signal conditioning and further processing.

Both the output of the camera 138 and the UFPA 119 are coupled to a data fusion board 139. The fused image may be linked with display 141 by a wireless link. A transmitter 143 is used to transmit the fused image to the display 141. It will be observed that the wireless transmitter 143 may transmit a single fused image, or alternatively, the wireless transmitter 143 may transmit each signal individually for later processing. Further, a wired connection may also be used. The transmitted image(s) are stored in memory and processed according to the requirements of the particular application. For example, the images are stored in memory and manipulated such that all images are formatted to a common scale. Such an example is useful where multiple signals are transmitted. By converting the images to a consistent pixel and size format, pixel-by-pixel data fusion can be realized, and other digital manipulation such as addition, subtraction etc. can be performed.

Figure 6B:
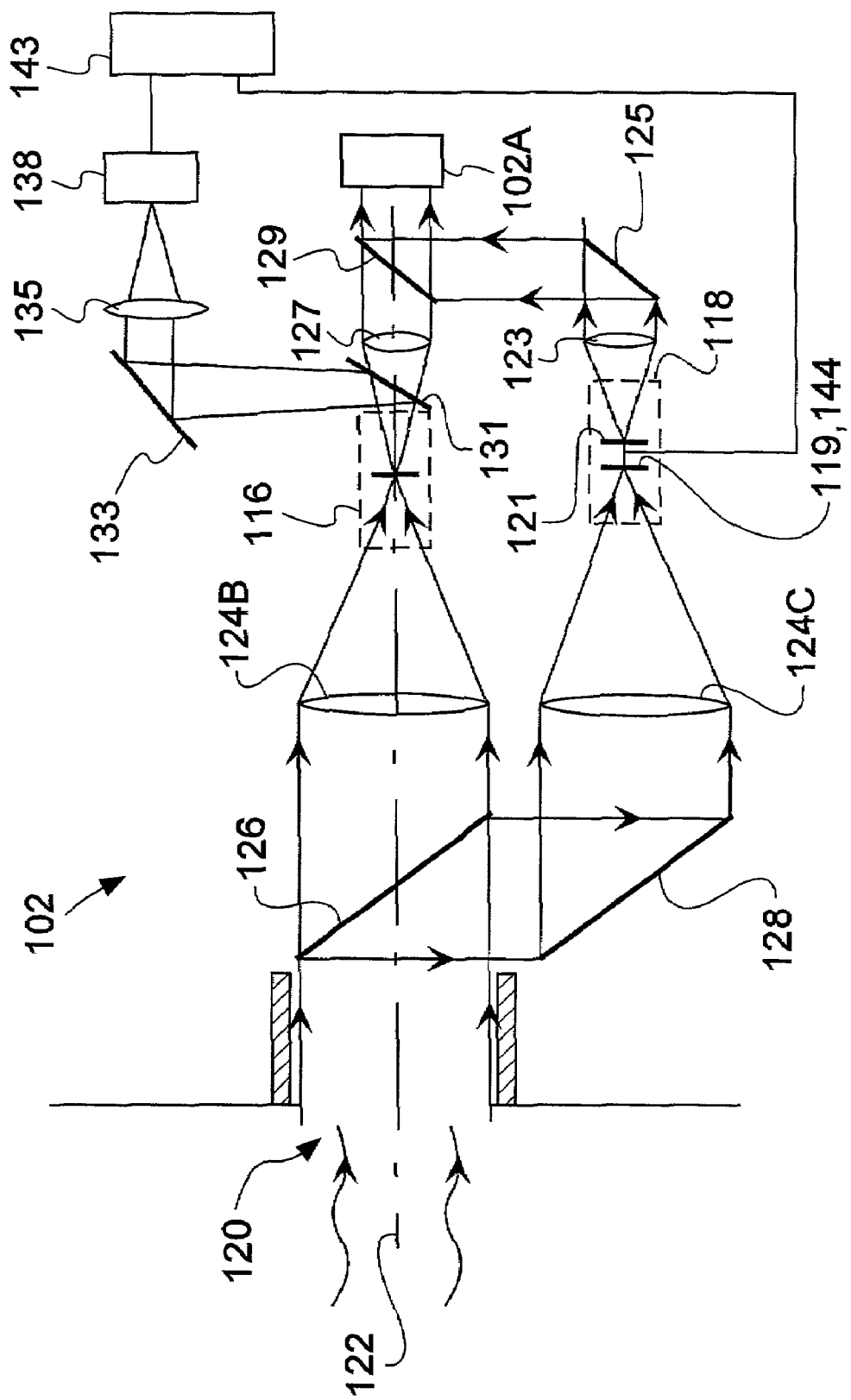
FIG. 6B is a diagrammatic illustration of the infrared imaging system according to one embodiment of the present invention illustrating an alternative embodiment for the display of the images where a near infrared image from a first sensor may be fused with a long infrared image from a second sensor on a display optically and electronically.

Referring to FIG. 6B, the sensor device 102 is similar to the embodiment described with respect to FIG. 6A, however, the optical viewer 102A displays an image fused from radiation in the VIS/NIR and LWIR spectral ranges. Radiation propagating along the input axis 122 enters the sensor assembly 102 at aperture 120. Beam splitter 126 transmits radiation in the VIS/NIR spectral ranges through the objective lens 124b and into the NIR sensor 116. The image exits from the NIR sensor 116 and passes through a prism 131 where a copy of the image is transmitted through the lens 127 to the optical viewer 102A. A second copy of the image from the NIR. sensor 116 is reflected off mirror 133, transmitted through lens 135 to camera 138. Camera 138 converts the optical image to an electronic image. Further, electronics may be provided for signal processing and conditioning. The output of the camera 138 is sent to the wireless transmitter 143.

Radiation in the LWIR spectral range is reflected by the beam splitter 126, reflected by the mirror 128, is transmitted through the objective lens 124c and enters the LWIR sensor 118. The LWIR sensor 118 as illustrated in FIG. 6B includes a UFPA 119 or other similar device capable of converting radiation in the LWIR spectral range to an electronic signal (further electronics may also be included for signal conditioning and further processing) as well as a display device 121 such as described with reference to FIGS. 3B and 4B. A copy of the output of the UFPA 119 is sent to the wireless transmitter 143 through electronics. Further, a visible image from the display device 121 is transmitted through lens 123, is reflected off mirror 125 to beam combiner 129, and is sent to the optical viewer 102A to fuse the VIS/NIR image optically.

Referring back to FIG. 2, after signal processing 160, the VIS/NIR and LWIR output signals 142, 146 are displayed on a single optics and viewing window 148, a Liquid Crystal Display (LCD) for example. The optics and viewing window 148 forms an integral component of the sensor assembly 102, and in particular, the display device 102D in FIG. 1A. The optics and viewing window 148 allows both the VIS/NIR and LWIR output signals 142, 146 to be displayed either individually or concomitantly. As best illustrated in FIG. 1A, the display device 102D is designed to not interfere with operator/wearer's normal line of vision, however the optics and viewing window 148 can be viewed by looking upwards.

Figure 7:
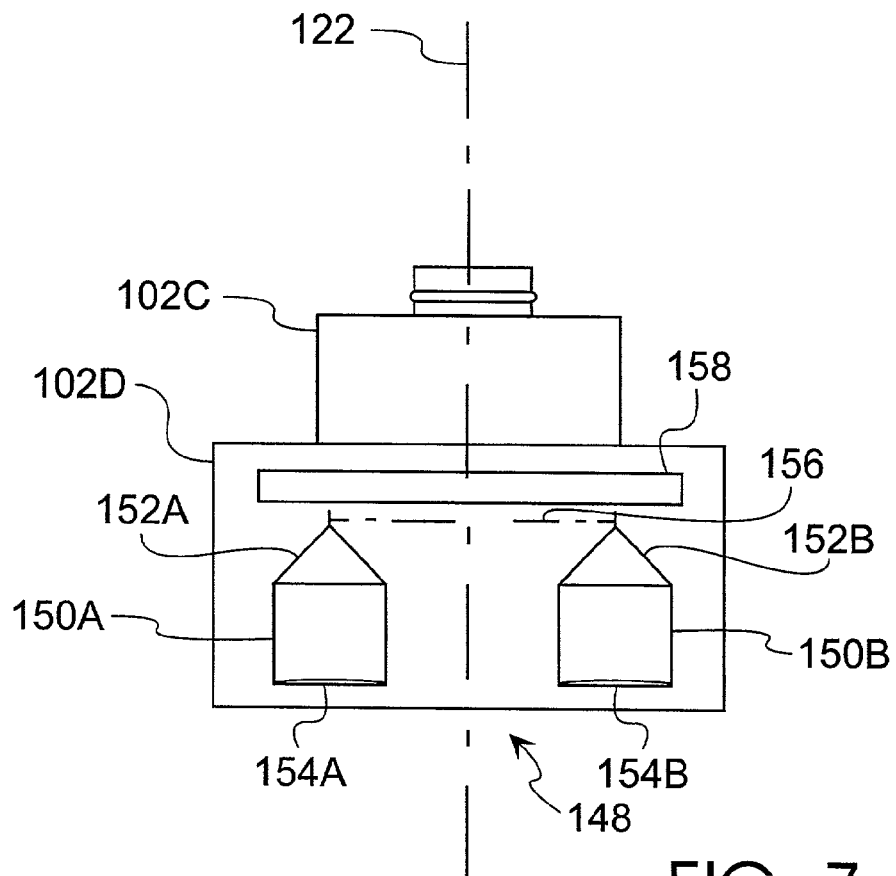
FIG. 7 is a top view of the dual sensor camera and display components of the infrared imaging system according to one embodiment of the present invention, further illustrating diagrammatically the display arrangement; and, FIG. 8 is an illustration of the back and side of the dual sensor camera and display components of the infrared imaging system according to one embodiment of the present invention.

As shown in FIG. 7, to avoid parallax, the display device 102D is arranged in-line along a common optical axis 122 with the camera 102C. Elimination of parallax is important because a dead angle between the display device 102D and the camera 102C may create difficulty for an operator in positioning a target. For example, because parallax is eliminated, a doctor can do surgery in dark conditions and in harsh environments such as a dark battlefield.

It should be appreciated that the optics and viewing window 148 may be implemented in any number of display types, however the LCD is preferred. For example, a suitable LCD comprises two-piece, monochromatic, transmissive, white twisted nematic LCDs 150A, 150B. Further, each nematic LCD 150A, 150B may include a backlighting source 152A, 152B respectively. An observation window 154A, 154B is placed in front of each nematic LCD 150A, 150B. The observation windows 154A, 154B are preferably repositionable within the optics and viewing window 148 to suitably line up with the pupil of an operator. A magnification lens may be placed in the front of each viewing window to enlarge the image, such as the equivalent of a 52" screen. The horizontal distance 156 between the observation windows 154A, 154B defines the interpupillary distance and may be adjustable for example between 52 mm and 72 mm. When the sensor assembly 102 is mounted just above the user's eyes, the infrared imaging system 100 does not block the view of an operator when gazing straight forward or down. By rotating the eyes upward, the display 102D is viewable. Further, the display device 102D may be implemented as either a grayscale or color display. The display device 102D may further house necessary components such as video boards or other electrical circuitry 158.

Referring back to FIG. 2, the infrared imaging system 100 further includes electronic circuitry 140, 144, processing circuitry 160 and controls 162 for adjusting and controlling various aspects of the sensor assembly 102. The exact functions provided by the electronic circuitry 140, 144, processing circuitry 160 and controls 162 may vary depending upon components selected to implement the optics and viewing window 148, the NIR sensor 116 and the LWIR sensor 118. Further, the electronic circuitry 140, 144, and processing circuitry can comprise any combination of hardware and software. For the preferred display discussed above with reference to FIG. 7, it is advantageous to convert the VIS/NIR and LWIR output signals 142, 146 to a standard electronic image, such as the ANSI STD-170M, RS-170 format. The processing circuitry 160 and controls 162 further implement a switching arrangement wherein the image viewed on the optics and viewing window 148 is the VIS/NIR image-full screen, the LWIR image-full screen, or the screen is shared between the VIS/NIR and LWIR images. For example, the screen may be split, with the VIS/NIR image on one half of the screen, and the LWIR image on the other half of the screen. Further, two images can overlap or be displayed picture in picture.

The sensitivities of the UFPA pixels used to implement the LWIR sensor 118 are known to vary widely. Also, some pixels may be dead, that is, the pixels exhibit no or low sensitivity. Thirdly, dc offset may affect reading results. The electronic circuitry 144 includes correction circuitry, implemented using either analog or digital circuitry, however a digital correction circuit is preferred. Digital correction circuitry corrects the pixel uniformity and replaces the dead pixels by surrounding live pixels and further provides auto gain and auto contrast functionality. Automatic signal saturation control, and signal processing chain allows the quick recovery of normal video from hot spots caused by gun blasts, projectile impact, and missile firing and other sources of hot spots.

The electronic circuitry 144 allows for power on demand to the LWIR sensor, such that when powered up, an image is immediately available. One source of delay when powering up a conventional FPA is the delay in acquiring the image caused by the TE cooling system. The FPA will not display an image until it reaches it's required Minimum Resolvable Temperature (MRT). Because it takes a finite time for the TE cooling system to reach the MRT, there can be delays as significant as one minute with conventional systems. This delay may be unacceptable under certain conditions. The present invention preferably avoids the use of such cooling strategies. Where suitable cooling is necessary, the electronic circuitry may bypass the TE cooling device at startup to achieve a faster image start up, then switch in the TE cooling when appropriate. The exact electronic circuitry 144 implemented will depend upon the specific requirements of the application. However, an example of a suitable control scheme is to convert the output of the UFPA to a digital signal using an analog to digital converter, then to a digital signal proccesing circuit, preferably a single digital signal processing chip such as a DSP chip or an ALTERA chip. Within the ALTERA chip, all signal processing can be implemented using ALTERA Variable Hardware Description Language (VHDL).

Referring to FIG. 2, the processing circuitry 160 and controls 162 may optionally be used to implement any number of advanced features such as providing a wireless audio and video transmitter, video in and out ports, image brightness, contrast, on/off switch and calibration controls, auto-focus, a low battery indicator warning, voice activated commands, pseudo-color image processing and pattern recognition. Polarity switching may optionally be provided for as well. For example, the thermal image of a black and white display may be set to either black representing hot, or white representing hot. Further, additional components may be integrated into the system, such as an eye safe infrared laser illuminator 164 to increase the detection range of the NIR sensor 116. Further, where fusion of VIS/NIR and LWIR signals is implemented, the processing circuitry 160 and controls 162 may provide for the ability to mix the range of image presentation from 0% to 100% for both the thermal and image intensifier outputs. Where focus is motorized, the controls 162 may provide for fingertip control of focusing operations.

The image may be displayed consisting entirely of the output of the NIR sensor 116, entirely from the LWIR sensor 118, or from a blending of the signals. The processing circuitry 160 may fuse the outputs of the NIR and LWIR sensors 116, 118 together. It will be observed that by using a single aperture 120, the NIR and LWIR sensors 116, 118 are aligned along a common optical axis, and as such, blurring of the signals is reduced whether combining the signals optically or electronically. Advanced signal processing can then be accomplished such as a pixel-by-pixel addition, subtraction, convolution, and image enhancement.

If a common optical aperture is not a critical requirement, two objective lenses will be used for VIS/NIR and LWIR independently. There are two ways to combine two images. One is to use time-share method. By using a video switch, it is possible to switch the VIS/NIR image and the LWIR image on the LCD alternatively, thus both images will not be displayed (or blurred) at the same time but can be viewed as an overlapped image if the frame rate is controlled properly. As an alternative for viewing a fused image, unique displays for each eye may be realized. The second method is to use the brain effect. For example, an image representing the output of the NIR sensor 116 may be viewed by only the right eye, while an image representing the output of the LWIR sensor may be viewed only by the left eye. By opening two eyes, the two images are overlapped if the optical systems for both sensor are identical.

Figure 8:
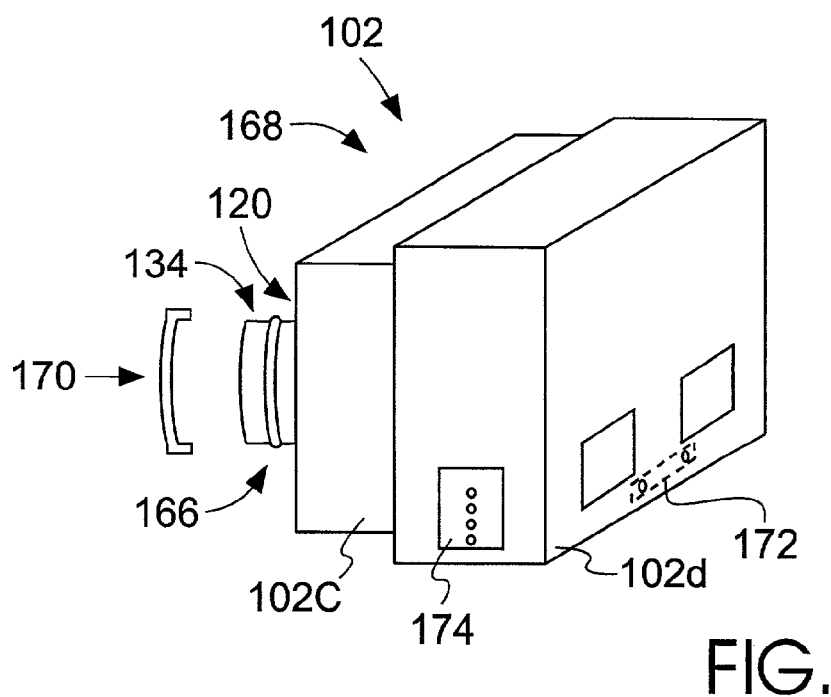

Referring to FIG. 8, in order to protect the sensor assembly 102, a high strength plastic or other suitable material may be used to form an envelope 168 for the aperture 120, camera 102C and display device 102D. On the inner surface of the envelope 168, a thin layer of metal net (not shown) is molded to shield against magnetic electrical radiation. Further, the use of materials such as foam spacers (not shown) and lens cap 170 may be used to protect the sensor assembly 102 against vibration and impact. The Iris 134 and focus/adjust knobs 166 are the only items outside the envelope 168, and these items are positioned at the frontier of the objective lens 124a.

It will be observed that the controls 162 illustrated in FIG. 2 need not be implemented in the same physical location. For example, the interpupillary distance adjustment is implemented by interpupillary adjustment buttons 172 at the bottom of the display device 102D, and a panel of buttons 174, including brightness, polarity contrast, calibration, and power on/off controls are provided along the side of the sensor assembly 102. The lens cap 170 is screwed to the envelope 168 and may include a rubber band to form a water tight seal. Where the sensor assembly 102 incorporates a manual iris and focus adjust knobs, it is preferable that the lens cap 170 be long enough to provide suitable protection. The lens cap 170 may incorporate a thin, hot pressed ZnS window. Further, a cap (not shown) may be provided for the interpupillary distance adjustment knob. All membrane buttons are covered by a thin layer of plastic molded integral to the envelope 168 to provide further protection from adverse environmental conditions.

An optional wiper may be provided to keep the window clean. For example, a single blade wiper may be used to circulate the slurry from light rain, snow, or other harsh environmental conditions. The hot pressed ZnS window provides mechanical characteristics that allow the use of such a wiper. For example, the ZnS window has a high hardness and melting point, as well as good chemical stability exhibiting zero water solubility. Therefore the load of the wiper blade against the window should not evidence delamination, cracking, pitting, scratching, or the like.

Having described the invention in detail and by reference to preferred embodiments thereof, it will be apparent that modifications and variations are possible without departing from the scope of the invention defined in the appended claims.

What is claimed is:

1. An image fusing system comprising:
   a camera having:
   a common aperture arranged to allow target radiation to enter said camera along a common optical axis;
   a beam splitter arranged to receive said target radiation passed through said common aperture and to split said target radiation into a first spectral band and a second spectral band which is different from said first spectral band, wherein said target radiation in said first spectral band is directed along a first optical path and said target radiation in said second spectral band is directed along a second optical path;

a first sensor arranged to receive said radiation in said first spectral band and to provide a first optical output representing a first optical image of said radiation filtered into said first spectral band, said first sensor comprising at least one of a charge coupled device or an image intensifier and generates said first optical output;

a first objective lens in said first optical path between said beam splitter and said first sensor, wherein said first objective lens is transmissive to radiation in at least a portion of said first spectral band;

a second sensor arranged to receive said radiation in said second spectral band and to provide a second optical output representing a second optical image of said radiation filtered into a second spectral band, said second sensor comprising an infrared focal plane array (FPA) and a display to convert an electronic output of said FPA to a visible image corresponding to said second optical output;

a second objective lens in said second optical path between said beam splitter and said second sensor, wherein said second objective lens is transmissive to said radiation in at least a portion of said second spectral band;

a beam combining device arranged to optically fuse said first optical output from said first sensor and said second optical output from said second sensor into a third optical output; and a viewer for viewing said third optical output; wherein:
said first sensor and said second sensor share said common aperture such that parallax between said first and second sensors is substantially eliminated and said camera and said viewer are aligned along said common optical axis such that parallax between said camera and said viewer is substantially eliminated;

said first spectral band comprises a visible and/or near infrared (VIS/NIR) image of said radiation;

said second spectral band comprises at least one of a short wave infrared (SWIR), medium wave infrared (MWIR) or long wave infrared (LWIR) image of said radiation; and said beam combining device comprises a narrow band filter to pass substantially all green light from said first sensor at a peak wavelength of near 0.55 micrometers with a bandwidth of near ±0.01 micrometers, and to reflect substantially all other visible light from said display of said second sensor to fuse
said VIS/NIR and SWIR/MWIR/LWIR images.

2. The image fusing system according to claim 1, wherein:
said second sensor further converts said radiation in said second spectral band into a second electronic output; and
said first sensor further converts said radiation in said first spectral band received by said first sensor into a first electronic output;
said image fusing system further comprises:
a processor arranged to electronically fuse or combine said first electronic output and said second electronic output into a third electronic output; and
a display device arranged to selectively display at least one of said first electronic output, said second electronic output or said third electronic output.

3. The image fusing system according to claim 2, further comprising:
a transmitter to wirelessly transmit at least one of said first, second, and third electronic outputs to a remote receiver.

4. The image fusing system according to claim 2, wherein:
said processor electronically combines or fuses said first electronic output and second electronic output at the same time as said beam combining device optically fuses said first optical output and said second optical output.

5. An image fusing system comprising:
a camera having:
a common aperture arranged to allow target radiation to enter said camera along a common optical axis;
a beam splitter arranged to receive said target radiation passed through said common aperture and to split said target radiation into a first spectral band and a second spectral band which is different from said first spectral band;
a first sensor arranged to receive said radiation in said first spectral band and provide a first image of said radiation filtered into said first spectral band;
a first optical output derived from said first image;
an electro-optic camera to convert said first optical output to a first electronic output derived from said first image;
a second sensor arranged to receive said radiation in said second spectral band and provide a second image of said radiation filtered into said second spectral band, said second sensor comprising an infrared focal plane array (FPA) that derives a second electronic output from said image and a display to convert said second electronic output to a second optical output derived from said second image;
a beam combining device arranged to optically fuse said first optical output and said second optical output into a third optical output;
a viewer for viewing at least one of said first optical output, said second optical output or said third optical output;
a fusion board having a processor arranged to electronically fuse or combine said first electronic output and said second electronic output into a third electronic output; and
a display device arranged to selectively display at least one of said first electronic output, said second electronic output or said third electronic output;
wherein:
said first sensor and said second sensor share said common aperture such that parallax between said first and second sensors is substantially eliminated and said camera and said viewer are aligned along said common optical axis such that parallax between said camera and said viewer is substantially eliminated;
said first spectral band comprises a visible and/or near infrared (VIS/NIR) optical and electronic image of said radiation from said first sensor;
said second spectral band comprises a short wave infrared (SWIR), middle wave infrared (MWIR) or a long wave infrared (LWIR) optical and electronic image of said radiation from said second sensor; and
said beam combining device comprises a narrow band filter to pass substantially all green light from said first sensor at a peak wavelength of near 0.55 micrometers with a bandwidth of near ±0.01 micrometers, and to reflect substantially all other visible light from said display of said second sensor to optically fuse said VIS/NIR and SWIR/MWIR/LWIR images.

6. The image fusing system according to claim 5, further comprising:
a transmitter to wirelessly transmit at least one of said first, second or third electronic outputs to a remote receiver.

7. The image fusing system according to claim 5, wherein:
said common aperture comprises a common lens that is transmissive to at least a portion of said first spectral band and at least a portion of said second spectral band; and
said image fusing system further comprises:
a first relay lens in a first optical path between said beam splitter and said first sensor to correct aberrations in said first spectral band; and
a second relay lens in a second optical path between beam splitter and said second sensor to correct aberrations in said second spectral band.

8. The image fusing system according to claim 7, wherein:
said first spectral band comprises the visible and/or near infrared (VIS/NIR) band of said radiation;
said second spectral band comprises at least one of a short wave infrared (SWIR), medium wave infrared (MWIR) or a long wave infrared (LWIR) band of said radiation;
said common lens passes radiation in at least a portion of said VIS/NIR band and at least a portion of said SWIR/MWIR/LWIR band;
said first relay lens corrects aberrations within the VIS/NIR band within at least a portion of about 0.4 micrometers to about 1.1 micrometers; and
said second relay lens corrects aberrations within the SWIR band within at least a portion of about 1 micrometers to about 3 micrometers, within the MWIR band within at least a portion of about 3 micrometers to 7 micrometers, or within the LWIR band within at least a portion of about 8 micrometers to about 12 micrometers.

9. The image fusing system according to claim 5, wherein:
said beam splitter is arranged to split said radiation into a first optical path and a second optical path; and
said image fusing system further comprises:
a first objective lens in said first optical path between said beam splitter and said first sensor to filter radiation into said first spectral band; and
a second objective lens in said second optical path between said beam splitter and said second sensor to filter radiation into said second spectral;
wherein said target radiation is not filtered by any objective lens until after being split into said optical path and said second optical path.

10. The image fusing system according to claim 5, wherein:
said processor electronically combines or fuses said first and second electronic outputs at the same time as said beam combining device optically fuses said first optical output and said second optical output.

* * * * *